United States Patent
Shah

(10) Patent No.: US 12,199,827 B1
(45) Date of Patent: Jan. 14, 2025

(54) DONOR BASE STATIONS SUPPORTING WIRELESS BACKHAUL FOR RAPID INFRASTRUCTURE DEPLOYMENT

(71) Applicant: T-Mobile USA, Inc., Bellevue, WA (US)

(72) Inventor: Darshan Shah, Maple Valley, WA (US)

(73) Assignee: T-Mobile USA, Inc., WA (US)

( * ) Notice: Subject to any disclaimer, the term of this patent is extended or adjusted under 35 U.S.C. 154(b) by 267 days.

(21) Appl. No.: 17/246,379

(22) Filed: Apr. 30, 2021

(51) Int. Cl.
| H04W 36/00 | (2009.01) |
| H04L 41/12 | (2022.01) |
| H04W 28/20 | (2009.01) |
| H04W 76/10 | (2018.01) |
| H04W 84/04 | (2009.01) |

(52) U.S. Cl.
CPC ............. H04L 41/12 (2013.01); H04W 28/20 (2013.01); H04W 76/10 (2018.02); H04W 84/047 (2013.01)

(58) Field of Classification Search
None
See application file for complete search history.

(56) References Cited

U.S. PATENT DOCUMENTS

| 9,826,380 | B1 * | 11/2017 | Zait ...................... | H04M 15/63 |
| 2013/0258944 | A1 * | 10/2013 | Palanigounder ...... | H04W 24/02 370/328 |
| 2017/0164219 | A1 * | 6/2017 | Huang .................. | H04W 16/32 |
| 2019/0215763 | A1 * | 7/2019 | Jira ........................ | H04W 24/10 |
| 2019/0305923 | A1 * | 10/2019 | Luo ....................... | H04L 5/1476 |
| 2020/0145967 | A1 * | 5/2020 | Park ...................... | H04W 72/27 |
| 2020/0145997 | A1 | 5/2020 | Luo | |
| 2020/0305118 | A1 | 9/2020 | Ryu et al. | |
| 2021/0168798 | A1 | 6/2021 | Xu | |
| 2022/0039144 | A1 | 2/2022 | Alabbasi et al. | |
| 2022/0174668 | A1 | 6/2022 | Yuan | |
| 2022/0201767 | A1 * | 6/2022 | Wei ....................... | H04W 16/10 |
| 2022/0279552 | A1 | 9/2022 | Teyeb | |
| 2022/0369164 | A1 | 11/2022 | Hu et al. | |
| 2022/0394737 | A1 * | 12/2022 | Liu ........................ | H04W 72/21 |

FOREIGN PATENT DOCUMENTS

WO WO2021089519 A1 5/2021

* cited by examiner

*Primary Examiner* — Pamit Kaur
(74) *Attorney, Agent, or Firm* — Lee & Hayes, P.C.

(57) ABSTRACT

Techniques for configuring a network system including base stations that support wireless backhaul are discussed herein. To provide network coverage for a new rural area with low network capacity requirements, a service provider may initially deploy a limited network configured with wired base stations that uses fiber links as backhaul. The limited network may have large coverage gap due to the time and cost associated with deploying fiber cables. In such low traffic areas, the system may reserve a portion of available frequency bands to use as wireless backhaul and configure wireless nodes to use the backhaul provided by the reserved frequency bands. The system may configure the existing wired base stations to serve as donor nodes to provide network link for the wireless nodes. The system may deploy a network of these wireless nodes to rapidly fill in coverage gaps.

18 Claims, 6 Drawing Sheets

500

CONFIGURE A DONOR BASE STATION TO USE A WIRED CONNECTION AS BACKHAUL BANDWIDTH AND TO SERVE AS DONOR NODE FOR A CHILD NODE BY PROVIDING WIRELESS BANDWIDTH TO THE CHILD NODE
502

↓

CONFIGURE A CHILD BASE STATION TO USE A WIRELESS SPECTRUM AS BACKHAUL BANDWIDTH AND USE A SUBSCRIBER IDENTITY MODULE (SIM) CARD, THE SIM CARD CONFIGURED WITH A SIM PROFILE INDICATING AN ASSOCIATED DEVICE TYPE IS BASE STATION TYPE
504

↓

DETERMINE THAT THE DONOR BASE STATION IS WIRELESSLY CONNECTED TO A PLURALITY OF DEVICES, WHEREIN INDIVIDUAL DEVICES OF THE PLURALITY OF DEVICES ARE ASSOCIATED WITH INDIVIDUAL SIM CARDS
506

↓

DETERMINE THAT THE DONOR BASE STATION IS WIRELESSLY CONNECTED TO THE CHILD BASE STATION
508

↓

DETERMINE, BASED AT LEAST IN PART ON THE SIM PROFILE INDICATING THE BASE STATION TYPE, TO INCREASE BANDWIDTH THROUGHPUT FROM THE DONOR BASE STATION TO THE CHILD BASE STATION
510

```
┌─────────────────────────────────────────────────────────────┐
│ ESTABLISH, AT A CHILD BASE STATION, A WIRELESS CONNECTION WITH A │
│ DONOR BASE STATION, WHEREIN THE DONOR BASE STATION SERVES AS A │
│ DONOR NODE FOR THE CHILD BASE STATION BY PROVIDING WIRELESS │
│ BANDWIDTH TO THE CHILD BASE STATION                         │
│ 602                                                         │
└─────────────────────────────────────────────────────────────┘
                              ↓
┌─────────────────────────────────────────────────────────────┐
│ RECEIVE FIRST DATA ASSOCIATED WITH A FIRST CONNECTION BETWEEN THE │
│ CHILD BASE STATION AND A FIRST DEVICE, WHEREIN THE FIRST DATA │
│ INCLUDES A FIRST SIM PROFILE INDICATING A DEVICE TYPE OF THE FIRST │
│ DEVICE IS A USER EQUIPMENT TYPE                             │
│ 604                                                         │
└─────────────────────────────────────────────────────────────┘
                              ↓
┌─────────────────────────────────────────────────────────────┐
│ RECEIVE SECOND DATA ASSOCIATED WITH A SECOND CONNECTION BETWEEN │
│ THE CHILD BASE STATION AND A SECOND DEVICE, WHEREIN THE SECOND │
│ DATA INCLUDES A SECOND SIM PROFILE INDICATING THE DEVICE TYPE OF │
│ THE SECOND DEVICE IS A BASE STATION TYPE                    │
│ 606                                                         │
└─────────────────────────────────────────────────────────────┘
                              ↓
┌─────────────────────────────────────────────────────────────┐
│ DETERMINE, BASED AT LEAST IN PART ON THE SECOND SIM PROFILE │
│ INDICATING THE BASE STATION TYPE, TO INCREASE BANDWIDTH THROUGHPUT │
│ FOR THE SECOND CONNECTION TO THE SECOND DEVICE, WHEREIN THE CHILD │
│ BASE STATION SERVES AS THE DONOR NODE FOR THE SECOND DEVICE │
│ 608                                                         │
└─────────────────────────────────────────────────────────────┘
                              ↓
┌─────────────────────────────────────────────────────────────┐
│ AGGREGATE THE FIRST DATA AND SECOND DATA TO FORM AGGREGATED │
│ UPLINK DATA                                                 │
│ 610                                                         │
└─────────────────────────────────────────────────────────────┘
                              ↓
┌─────────────────────────────────────────────────────────────┐
│ TRANSMIT THE AGGREGATED UPLINK DATA TO THE DONOR BASE STATION │
│ 612                                                         │
└─────────────────────────────────────────────────────────────┘
```

FIG. 6

DONOR BASE STATIONS SUPPORTING WIRELESS BACKHAUL FOR RAPID INFRASTRUCTURE DEPLOYMENT

BACKGROUND

Modern telecommunication systems include heterogeneous mixtures of second, third, fourth, and fifth generation (2G, 3G, 4G, 5G) cellular wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies.

To provide infrastructure for wireless communication technologies, network nodes may be deployed to provide support a particular type of network. These network nodes enable connectivity to support the infrastructure and systems for the next-generation networks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates an example process for configuring a base station to support wireless backhaul.

FIG. 6 illustrates another example process for configuring a base station to support wireless backhaul.

DETAILED DESCRIPTION

Figure 1:
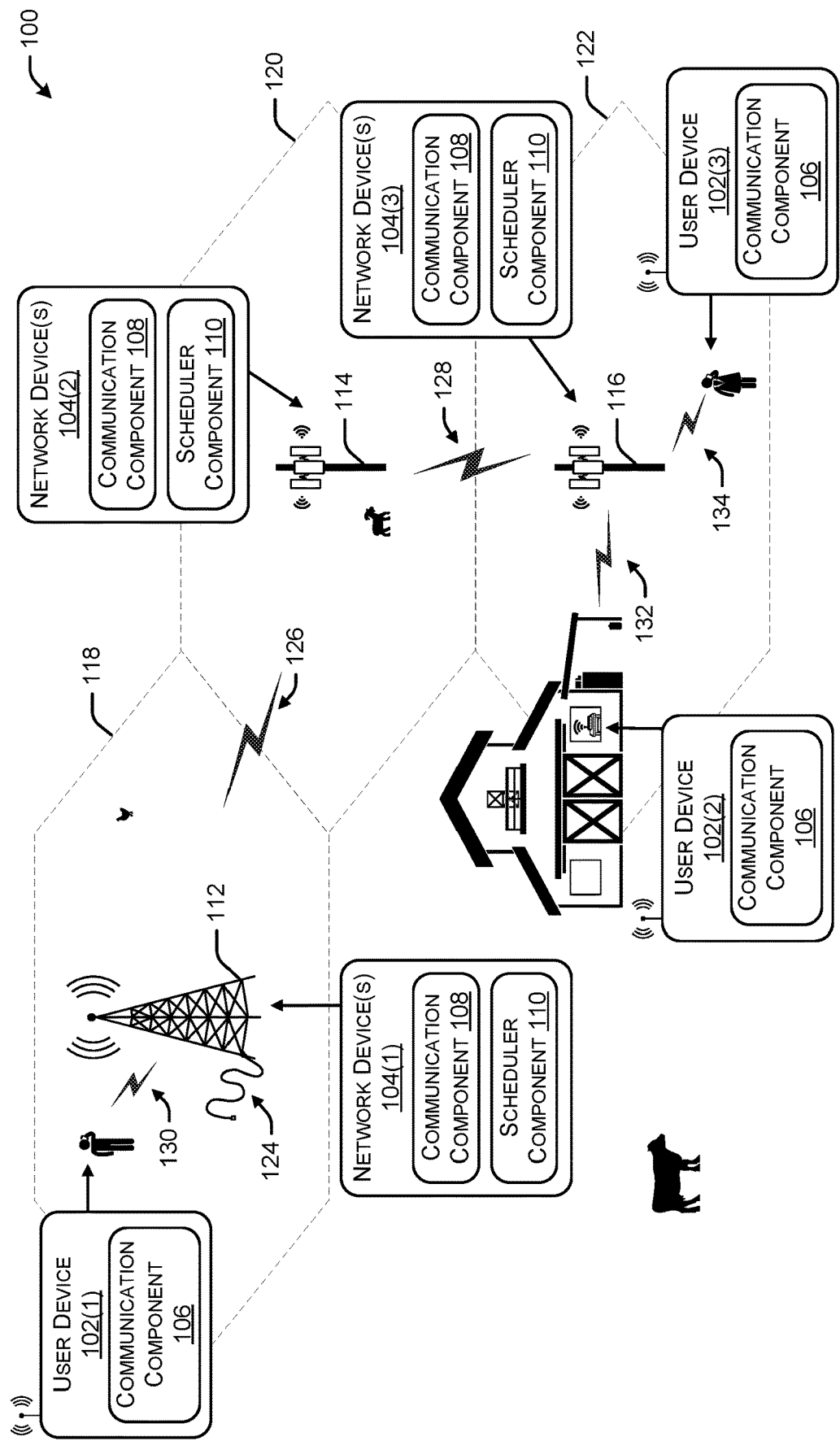
FIG. 1 illustrates an example system including base stations configured to support wireless backhaul to provide network service.

Techniques for configuring a network system with base stations that support wireless backhaul are discussed herein. In a traditional cellular network, traditional base stations use backhaul provided by either fiber or microwave. In some examples, in rural areas or similar sparsely populated coverage regions, with low network capacity requirements ("low traffic region"), the challenges and costs associated with either fiber or microwave make both options not feasible. To provide network coverage for such a low-traffic region, a service provider may deploy a network configured with base stations ("network nodes" or "nodes") that use a combination of wired and wireless backhaul. The network may include a donor base station ("donor node") configured to use a wired backhaul (e.g., optical fiber) and to provide wireless backhaul to one or more wireless base stations ("child nodes"). In some examples, the network may determine to reserve a portion of available frequency bands ("reserved frequency bands" or "wireless spectrum") to use as wireless backhaul and configure the child nodes to use the backhaul provided by the reserved frequency bands.

In some examples, a wireless node may be configured to request wireless access from a donor node. The donor node can implement a network device configured to receive network access requests from any number of wireless devices within an associated coverage area. The wireless devices may be configured to use Subscriber Identity Module (SIM) cards and may include user devices (e.g., cell phones, smart devices, internet hubs, etc.) and/or wireless nodes. The donor node may receive a network access request from a wireless device and may receive a SIM profile for the wireless device. In some examples, the donor node may determine that the access request is from a wireless node based on determining that the SIM profile indicates that an associated device type is a "base station type." In response to the base station type, the donor node may establish a backhaul link to the wireless node using a reserved frequency band and may increase the wireless throughput for the wireless node. The wireless node is now a child node of the donor node.

In various examples, the network system may determine the optimal placement of wired and wireless nodes to optimize network coverage for a coverage region. The optimal placement of the wired and wireless nodes may consider the role of each node as part of a wireless chain and role as a backup node if a node in the wireless chain is broken. The system may generate a network topology map for the coverage region to select backup nodes to reconfigure if a particular node goes down. For instance, if the wireless chain between two nodes (e.g., nodes A and C are connected by node B) is broken by a node failure, then a network scheduler may instruct node A and/or node C to increase their transmission power to form a connection between the two nodes. Thus, under a default transmission power level, node A can reach node B, and node B can reach node C, but node A cannot reach node C. In some examples, the system may assign nodes to a network cluster, where each network cluster has a primary donor node (e.g., the donor node with fiber link). The primary donor node may implement the network scheduler and can send instructions to other nodes within the cluster to reconfigure during a node failure.

In some examples, a carrier network may determine to charge different fees for different device types and/or subscription plans (e.g., static home internet service, monthly mobile plan, prepaid mobile plan, etc.). The present system may determine which device type is accessing the network based on the SIM profile. For instance, a child node may serve a sparsely populated rural area, where a subscriber may have a mobile phone on a limited minutes plan and a Wi-Fi hub on an unlimited data monthly plan. The mobile phone and the Wi-Fi hub may each be configured to use a SIM card to communicate with the child node. The child node may receive communication data from all served devices and may aggregate the communication data into aggregated data. The aggregated data may include metadata to indicate the devices using the data. The child node may transmit the aggregated data to a donor node. A network device may parse the aggregated data to determine data use for each device.

The systems and methods described herein can be used to deploy a wireless network with base stations configured to support wireless backhaul. As noted above, traditional base stations use backhaul provided by either fiber or microwave. However, in sparsely populated regions with low network capacity requirements, the challenges and costs associated with fiber or microwave make both options not feasible. The present system provides fast and cost-effective deployment of wireless service to these sparsely populated regions. The system may monitor network access and signal quality to determine the frequency bands ("wireless spectrum") to use for wireless backhaul to optimize network traffic. Additionally, the system may determine more access capacity is needed and may flag a wireless node for an upgrade to a wired node to further optimize network traffic. Moreover, by positioning the base stations to allow for a portion of the nodes to serve as backup nodes within the network, the system may reduce coverage downtime. These and other improvements to the functioning of a computer and network are discussed herein.

In some examples, the techniques discussed herein can be implemented in the context of protocols associated with one or more of 3G, 4G, 4G LTE, 5G protocols. In some examples, the network implementations can support stand-alone architectures, non-standalone architectures, dual connectivity, carrier aggregation, etc. Example implementations are provided below with reference to the following figures.

FIG. 1 illustrates an example system 100 including base stations configured to support wireless backhaul to provide network service.

The user device 102(1), user device 102(2), and user device 102(3) (collectively referred to as user devices 102) can communicatively connect with other devices, including network node(s) (e.g., via network devices 104) associated with a cellular carrier, via one or more network(s) (e.g., access networks 118, 120, and 122). In an example, the example system 100 shows user device 102(1), user device 102(2), and user device 102(3) can connect to the one or more network(s) to engage in data transfers and/or any other type of communication. The user device(s) 102 can be any user device that can connect and communicate between the next-generation network (e.g., 5G SA) and the legacy network (e.g., 4G LTE). In some examples, the user device(s) 102 can be a mobile phone, such as a smartphone or other cellular phone. In other examples, the user device(s) 102 can be a personal digital assistant (PDA), a media player, a tablet computer, a gaming device, a smartwatch, a network hub, a personal computer (PC) such as a laptop, desktop, or workstation, or any other type of computing or communication device. The user device(s) 102 may include a SIM card and a communication component 106. In some examples, the user device(s) 102 may use data from the SIM card and the communication component 106 to establish connections (e.g., wireless access 130, 132, and 134) with corresponding network nodes (e.g., nodes 112, 114, and 116) to transmit data, including information to identify the device and/or device type.

The user device(s) 102 may include a SIM card from a cellular carrier. The SIM card may store data ("SIM data" or "SIM profile") associated with the user device(s) 102, the carrier, and/or subscription information. In some examples, the SIM profile may indicate the user device(s) 102 is associated with a subscription for a cellular carrier and may further indicate any features and/or services that are supported based on the subscription. The SIM data may include the carrier and/or network information used to authenticate and identify subscribers on the network, the information including, but not limited to, an international mobile subscriber identity (IMSI), authentication key, an Integrated Circuit Card Identification Number (ICCID), Local Area Identity (LAI), Service Provider Name (SPN), Service Dialing Numbers (SDN), a Subscription Concealed Identifier (SUCI), a Subscription Permanent Identifier (SUPI), and the like.

The communication component 106 may include functions to support communication sessions and/or related data transmission. In some examples, the communication component 106 may include a communication client to interface with a user and a network. The communication component 106 may provide access to a user portal to register an associated user device for subscription to wireless service from a service provider. The communication component 106 may configure a communication parameter based on the subscription and the access network. The communication parameter may include, but is not limited to, access type, frequency band, data transport limits, and the like.

In some examples, the user device(s) 102 can wirelessly connect to the network device(s) 104, one or more network nodes (e.g., network nodes 112, 114, and 116), or network servers, via the network(s) (e.g., network 118, 120, and 122) or other access points. In some examples, the network(s) can be a packet core network of an LTE network, which may be referred to as an Evolved Packet Core (EPC). In other examples, the network(s) can be a 5G core network.

The network nodes 112, 114, and 116 can include network device(s) 104(1), network device(s) 104(2), and network device(s) 104(3), respectively.

The network device(s) 104(1), the network device(s) 104(2), and the network device(s) 104(3) (collectively referred to as network devices 104) can communicatively connect with other devices, including the user devices 102 and other network node(s) (e.g., network nodes 112, 114, and 116) associated with a cellular carrier, via the one or more network(s). In some examples, a network device(s) 104 implemented in a wireless node may be configured to use a physical SIM card or an electronic SIM (eSIM) card associated with the cellular carrier to authenticate itself to access the cellular network provided by other network node(s). For instance, the network devices 104(2) and 104 (3) implemented on wireless nodes 114 and 116, respectively, may each be configured to use a SIM card to identify itself as a wireless device that is authenticated to use the access network(s) 118 and 120, respectively.

The network device(s) 104 can include a communication component 108 and a scheduler component 110. In some instances, the network device(s) 104 can include implementing one or more communication servers to facilitate communications by and between the various devices in the system 100. That is, the network device(s) 104 can represent any computing devices implementing various aspects of one or more of second, third, fourth, and fifth generation (2G, 3G, 4G, and 5G) cellular wireless access technologies, which may be cross-compatible and may operate collectively to provide data communication services.

Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 104 may implement GSM, UMTS, LTE/LTE Advanced, and/or NR telecommunications technologies.

In some instances, telecommunication technologies can be referred to generally as radio access technology. Thus, a 5G network can represent 5G radio access technology. The network nodes 112, 114, and 116 may include, but is not limited to, a combination of: base transceiver stations (BTSs) (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user device(s) 102, the network device(s) 104, and/or the network(s). In some embodiments, the network device(s) 104 may be operated by one or more service providers. A service provider may include a wireless service provider, telecommunications service provider, cellular carrier, network operator, mobile operator, and the like. The network device(s) 104 and associated components, including the communication component 108 and the scheduler component 110, may configure a database to maintain subscriber information with associated SIM card information to support the network.

The communication component 108 may include functions to provide support for communication sessions with devices in the network. In some examples, the communication component 108 may be implemented on a network device associated with a network node and may facilitate communication between the network node and other devices in the network. The communication component 108 may receive a request to establish a wireless connection from a wireless device. In various examples, the communication component 108 may receive SIM data from the wireless device. In some examples, the communication component 108 may determine a device type from the SIM data and/or a SIM profile associated with the wireless device. The device type may include, but is not limited to, base station type, cell phone type, internet hub type, and the like. The network may authenticate the wireless device for access, and the communication component 108 may determine to adjust a communication parameter based in part on the device type and/or subscription information.

In some examples, the communication component 108 may include functions to support a wireless link with a base station. As described herein, the communication component 108 may receive SIM data and determine the device type for the wireless device. If the device type indicates a base station type, the communication component 108 may configure the wireless link for the wireless device to be a child node. The communication component 108 may send instructions to configure one or more network node settings to optimize the wireless link to the child node. The one or more network node settings may include, but is not limited to, adjusting antenna direction and/or tilt (e.g., yaw, pitch, roll), selecting wireless backhaul band, increasing transmission power, increasing the wireless throughput, and the like.

The scheduler component 110 may determine to configure a base station to serve as a donor node and/or a child node. As described herein, the communication component 108 may receive, from a wireless base station, a request to establish a wireless connection with a local base station. In response to establishing the wireless connection, the scheduler component 110 may configure the local base station to use predetermined frequency bands ("wireless spectrum") as wireless backhaul link for the requesting wireless base station and to increase the bandwidth throughput to the wireless base station. The local base station serves as a donor node for the wireless base station, and the wireless base station is now a child node of the local base station.

In some examples, the local base station may also be a wireless base station that is also a child node to another base station, and the scheduler component 110 may select different frequency bands ("wireless spectrum") for each wireless backhaul. In some examples, the scheduler component 110 may determine which frequency bands to use for backhaul link and access link (e.g., 39 GHz as backhaul and 28 GHz on access, 28 GHz as backhaul and 28 GHz on access, 28 GHz as backhaul and 600 MHz on access, etc.). The scheduler component 110 may prioritize using high frequency bands (e.g., 28 GHz, 39 GHz, 24 GHz, etc.) for backhaul based on high frequency bands having higher bandwidth relative to low frequency bands.

While FIG. 1 illustrates the network(s) 124, 126, and 128, it is understood in the context of this document that the techniques discussed herein may also be implemented in other networking technologies, such as nodes that are part of a wide area network (WAN), metropolitan area network (MAN), local area network (LAN), neighborhood area network (NAN), personal area network (PAN), or the like. Examples of the network(s) can include but are not limited to networks including second-generation (2G), third-generation (3G), fourth-generation (4G) cellular networks, such as LTE (Long Term Evolution), fifth-generation (5G) networks, and data networks, such as Wi-Fi networks.

In some instances, the network device(s) 104 can communicate with any number of user equipment, user devices, servers, network devices, computing devices, and the like.

As a non-limiting example, the example system 100 can illustrate an example coverage area with base stations configured to use wireless backhaul. The example system 100 includes three example base stations, including an example donor node 112, an example donor/child node 114, and an example child node 116. The example coverage area is in low population farming county, where homes are sparsely distributed between many acres of farmland and the coverage area has a low network capacity requirement. The example coverage area includes the three example base stations.

The example donor node 112 includes a network device 104(1) and is a wired base station that uses example fiber 124 as backhaul. The example donor node 112 provides wireless coverage to example network 118. In the present example, the example donor node 112 may receive connection requests from the user device 102(1) and the network device(s) 104(2). The communication component 108 located on the network device 104(1) may determine, based on the device types on their respective SIM profiles, that the user device 102(1) is a mobile phone and the network device(s) 104(2) is a base station. The example donor node 112 may establish the wireless access 130 to the user device 102(1) and the wireless backhaul 126 to the network device(s) 104(2). The example donor node 112 may determine to increase the bandwidth throughput to the example donor/child node 114.

The example donor/child node 114 includes a network device 104(2) and is a wireless base station that uses example wireless backhaul 126. The example donor node 112 serves as a donor to the example donor/child node 114. The example donor/child node 114 provides wireless coverage to example network 120. In the present example, the example donor/child node 114 may receive a connection request from the network device(s) 104(3). The communication component 108 located on the network device 104(2) may determine, based on the device type, that the network device(s) 104(3) is a base station. The example donor/child node 114 may establish the wireless backhaul 128 to the network device(s) 104(3). The example donor/child node 114 may determine to increase the bandwidth throughput to the example child node 116.

The example child node 116 includes a network device 104(3) and is a wireless base station that uses example wireless backhaul 128. The example donor/child node 114 serves as a donor to the example child node 116. The example child node 116 provides wireless coverage to example network 122. In the present example, the example child node 116 may receive connection requests from the user device 102(2) and the user device 102(3). The example child node 116 may establish the wireless access 132 to the user device 102(2) and the wireless access 134 to the user device 102(3). The communication component 108 located on the network device 104(3) may determine, based on the device types on their respective SIM profiles, that the user device 102(2) is a wireless hub and the user device 102(3) is a mobile phone.

In the present example, if the example donor node 112 detects an unexpected disconnect to the donor/child node 114 and the example donor node 112 is configured to be a backup node for the example child node 116. For instance, the system may include a list of instructions that the example donor node 112 should execute should the donor/child node 114 fail. The instructions may include sending a notification to request for repair and reconfiguring the base station parameters to connect to the example child node 116.

Figure 2:
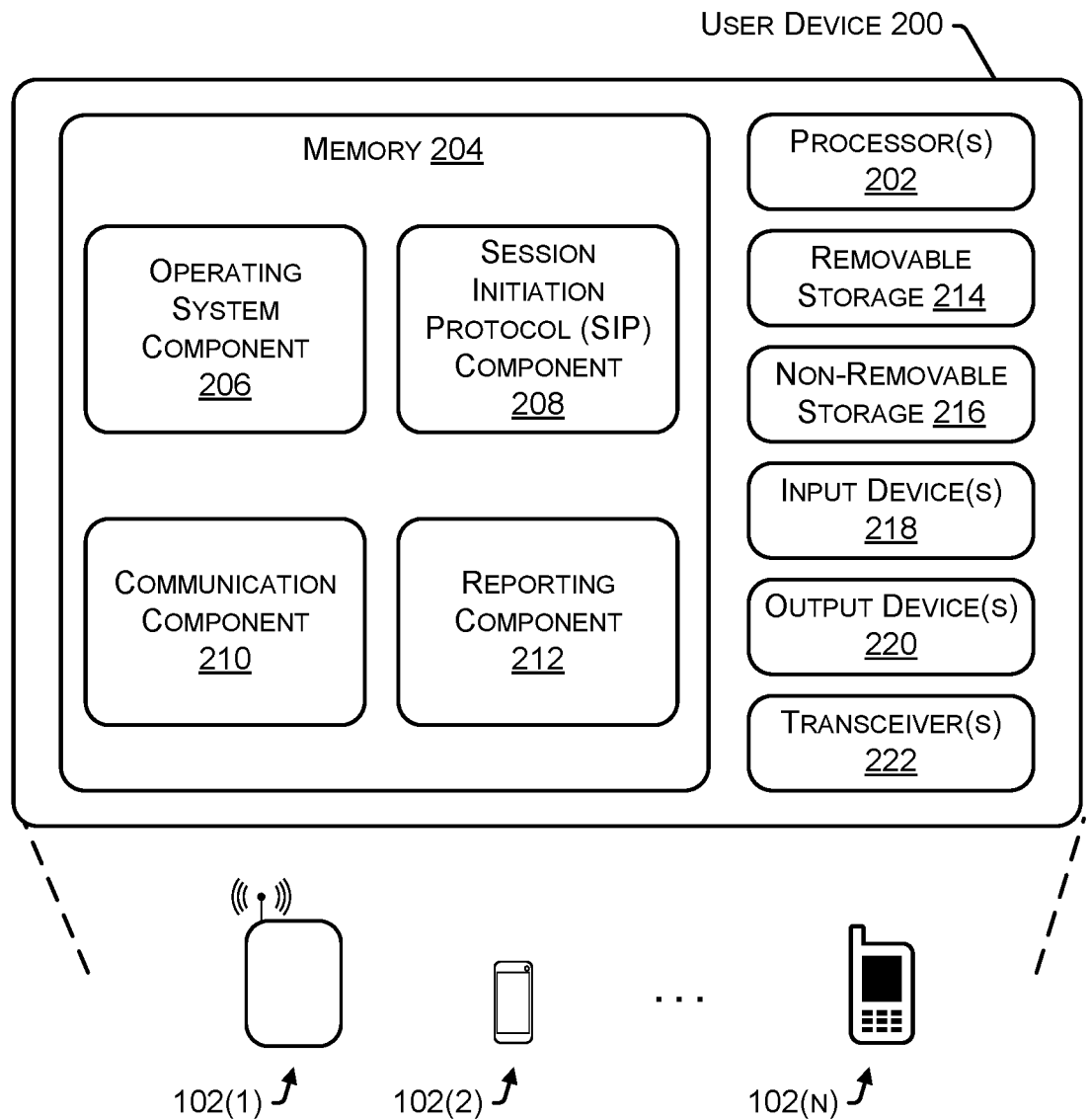
FIG. 2 is a block diagram of a user device.

FIG. 2 is a block diagram of user device 200 configured to use network service. In some embodiments, the user device 200 can correspond to the user device 102(1), user device 102(2), and the user device 102(3) of FIG. 1. It is to be understood in the context of this disclosure that the user device 200 can be implemented as a single device or as a plurality of devices with components and data distributed among them. By way of example, and without limitation, the user device 200 can be implemented as various user device 200(1), 200(2), . . . , 200(N).

As illustrated, the user device 200 comprises a memory 204 storing an operating system component 206, a Session Initiation Protocol (SIP) component 208, a communication component 210, and a reporting component 212. Also, the user device 200 includes processor(s) 202, a removable storage 214 and non-removable storage 216, input device(s) 218, output device(s) 220, and transceiver(s) 222.

In various embodiments, the memory 204 is volatile (such as RAM), non-volatile (such as ROM, flash memory, etc.) or some combination of the two. The operating system component 206, the SIP component 208, the communication component 210, and the reporting component 212 stored in the memory 204 can comprise methods, threads, processes, applications, or any other sort of executable instructions. The operating system component 206, the SIP component 208, the communication component 210, and the reporting component 212 can also include files and databases.

The operating system component 206 can include functionality to identify and track the different applications installed on the user device 200. The operating system component 206 can include functionality to query a chipset of the user device 200, and/or query the transceiver(s) 222, to instruct the transceiver(s) 222 and/or any software or hardware to scan one or more channels or frequency resources to determine metrics associated with the channel or frequency resources, for example. In some instances, the operating system component 206 can include an API to receive instructions from one or more of the SIP component 208, the communication component 210, and the reporting component 212 and to provide data to the corresponding components, including identifying the communication clients and/or communication capabilities of the user device 200 and/or a serving network, and notifying the components of clients and/or capabilities. The serving network may include one or more network(s) that the user device 200 is currently communicatively connected to. For instance, the user device 200 may be connected to a cellular network and/or connected to a home Wi-Fi network.

The SIP component 208 may enable communications to be served using SIP instances and/or SIP messages. The SIP component 208 may transmit SIP messages containing information for identifying the subscriber account, device (e.g., device type, device identifier, etc.), and/or the communication client to serve a communication session including but not limited to: SIP instance information, access network information, Mobile Station International Subscriber Directory Number (MSISDN), International Mobile Subscriber Identity (IMSI), International Mobile Equipment Identity (IMEI) of the device, Universally Unique Identifier (UUID), called-party-address as Circuit-Switched Routing Number (CSRN), and session description protocol (SDP). The SIP component 208 may use SIP signaling and determine the current location of the user device 200 using a Global Positioning System (GPS). In various examples, the SIP component 208 may transmit SIP messages with headers and/or strings to trigger specific functions and/or commands.

The communication component 210 may configure a communication client for send and receive communication data. In some instances, the communication component 210 can correspond to the communication component 106 of FIG. 1. As described herein with respect to the communication component 106, the communication component 210 may include functions to support communication sessions and/or related data transmission. The communication component 210 may determine the capability of the user device 200 and the serving network to determine the enabled feature information for a communication client. The serving network may include one or more network(s) that the user device 200 is currently registered on. In response to registering to a network, communication component 210 may send, to the network, a publish request to set the enabled feature information of the communication client. While the communication component 210 may send the enabled feature information to the network, it is understood in the context of this document that the user device 200 may send and/or receive the enabled feature information via the SIP component 208, the communication component 210, the reporting component 212, and/or another component.

The communication component 210 may include functionality to determine when to transition an existing communication from one access network to another. In some examples, the communication component 210 may perform a number of functions, such as interfacing with the transceiver(s) 222, preparing the user device 200 to receive communications, tuning the transceiver(s) 222, receiving and processing an invitation message such as a SIP instance received via the transceiver(s) 222, and the like. The communication component 210 may receive network quality information from the transceiver(s) 222, and the reporting component 212 may report it to the network.

The reporting component 212 may include functions to report on the network quality. In some examples, the communication component 210 may use the transceiver(s) 222 to perform a network quality test, and the reporting component 212 may transmit the results.

In some embodiments, the processor(s) 202 is a central processing unit (CPU), a graphics processing unit (GPU), or both CPU and GPU, or other processing unit or component known in the art.

The user device 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media can include volatile and non-volatile, removable and non-removable media implemented in any method or technology for storage of information, such as computer-readable instructions, data structures, program modules, or other data. Memory 204, removable storage 214, and non-removable storage 216 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user device 200. Any such tangible computer-readable media can be part of the user device 200.

In various embodiments, the user device 200 can include applications including but are not limited, a web browser application, a video streaming application, an online gaming application, a network analyzer, and the like. During execution on the user device 200, each of the applications may be configured to cause the user device 200 to initiate communications with a network node (e.g., network device 300) over the network(s).

The user device 200 may be configured to communicate over a telecommunications network using any common wireless and/or wired network access technology. Moreover, the user device 200 may be configured to run any compatible device operating system (OS), including but not limited to, Microsoft Windows Mobile, Google Android, Apple iOS, Linux Mobile, as well as any other common mobile device OS.

The user device 200 also can include input device(s) 218, such as a keypad, a cursor control, a touch-sensitive display, voice input device, etc., and output device(s) 220 such as a display, speakers, printers, etc. These devices are well known in the art and need not be discussed at length here.

As illustrated in FIG. 2, the user device 200 also includes one or more wired or wireless transceiver(s) 222. For example, the transceiver(s) 222 can include a network interface card (NIC), a network adapter, a LAN adapter, or a physical, virtual, or logical address to connect to the various network(s), or to the network device (e.g., network device 300), for example. To increase throughput when exchanging wireless data, the transceiver(s) 222 can utilize multiple-input/multiple-output (MIMO) technology. The transceiver(s) 222 can comprise any sort of wireless transceivers capable of engaging in wireless, radio frequency (RF) communication. The transceiver(s) 222 can also include other wireless modems, such as a modem for engaging in Wi-Fi, WiMax, Bluetooth, infrared communication, and the like.

In some examples, the user device 200 can be implemented as the user device(s) 102, including the communication component 106.

Figure 3:
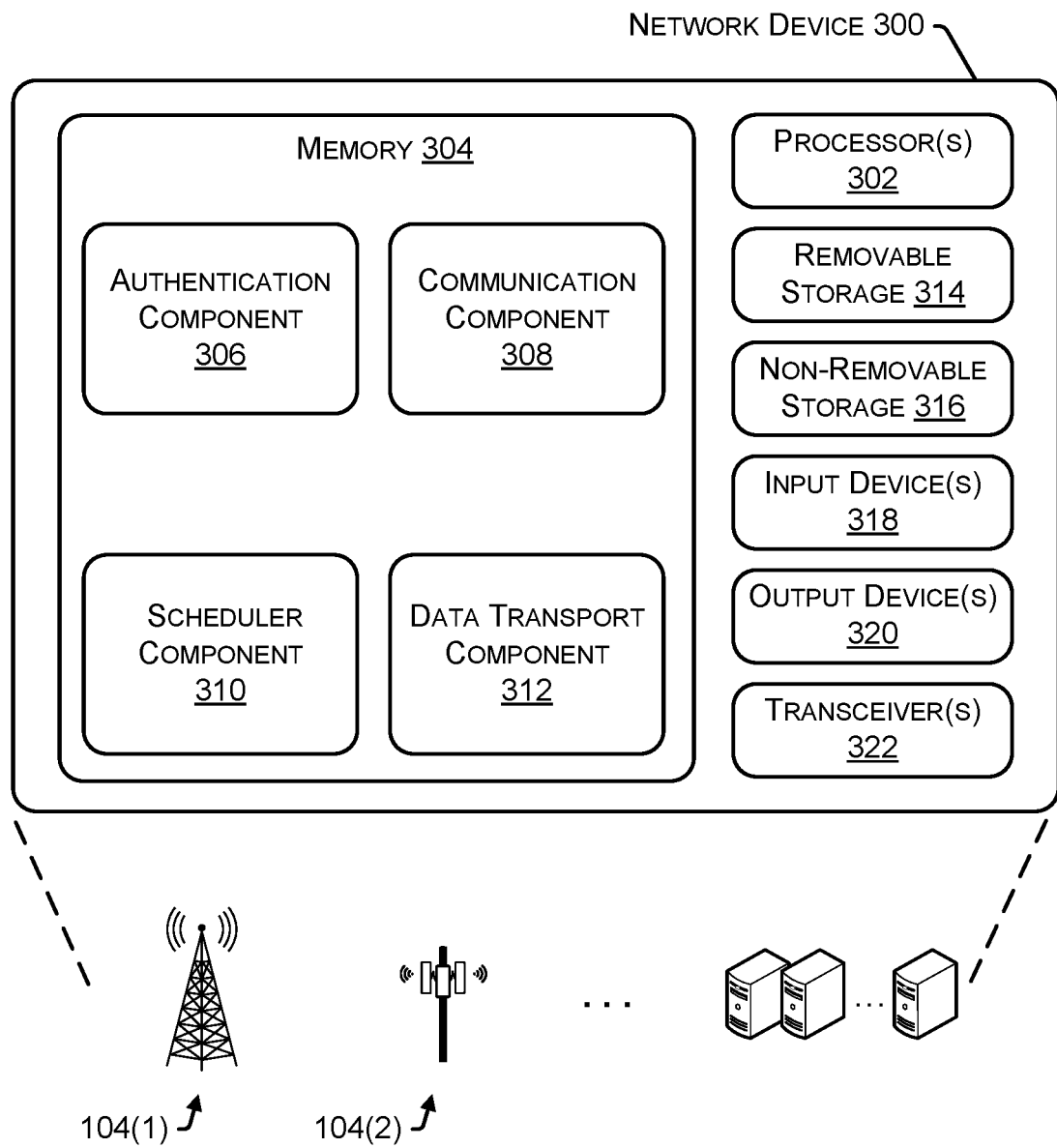
FIG. 3 is a block diagram of a network device configured to support wireless backhaul to provide network service.

FIG. 3 is a block diagram of a network device 300 configured to support wireless backhaul to provide network service. In some examples, the network device 300 can be configured to implement the techniques discussed herein.

In various examples, the network device 300 may include processor(s) 302 and memory 304. Depending on the exact configuration and type of computing device, the memory 304 may be volatile (such as RAM), non-volatile (such as ROM, flash memory, etc.) or some combination of the two.

FIG. 3 shows only basic, high-level components of the network device 300. Generally, the network device 300 may comprise and/or may be implemented in any of various network components discussed herein, including those components illustrated in FIG. 1. For example, the network device 300 may be implemented in the network device(s) 104, the network nodes 112, 114, and 116, the network(s), or other network devices.

The memory 304 may include an authentication component 306, a communication component 308, a data transport component 312, and a scheduler component 310.

The authentication component 306 can include functionality to identify and/or authenticate user devices, network devices, and/or any other communications components to interact with the network. The authentication component 306 may receive requests to initiate a device. The authentication component 306 may authorize the device to connect to the network by determining that the device has a valid SIM card. The authentication component 306 may grant authorization for the services that the device is allowed to access based on a device type, device location, and/or subscription data is once the device is successfully identified and authenticated. This authorization may be executed during a device registration procedure. In various examples, the authentication component 306 may determine that a SIM card is associated with a wireless base station. The authentication component 306, at the local base station, may receive SIM data, authenticate the network device, and determine based on the SIM data that the network device is associated with a base station type. The SIM card may be a physical SIM card or an electronic SIM (eSIM) card. In some examples, the SIM card may be associated with a SIM profile that is only authorized to access the network from a specific geographical location ("GPS location" or "geolocation"). The specific geolocation may be determined and stored based on any location initiating scheme including a predetermined GPS location, a first detected GPS location on boot, location detected during system setup, and the like. If the network detects the SIM profile is trying to access the network from a different geographical location, the network may determine not to authenticate the SIM profile for access. For instance, the wireless base station and the associated network device may be configured to access the network from the specific geographical location. If the connection to the wireless base station goes down and then attempts to reconnect from a second different GPS location, the system may request additional authentication information to authenticate the wireless base station; otherwise, the system may assume the network device has been stolen and moved to an unauthorized location and deny network access. In the present example, the authentication component 306 may determine a distance between a current geolocation and a stored geolocation, and may deny network access if the distance exceeds a distance threshold. The authentication component 306 may transmit mitigation procedure to wipe data and/or transmit a notification for device recovery.

In some examples, the authentication component 306 may use a SIM card to access the wireless network. As described herein with respect to the network device(s) 104, the network device 300 may be implemented in a wireless node and may be configured to use a SIM card associated with the cellular carrier. The authentication component 306 may use a physical SIM card or may receive and store an electronic SIM (eSIM) card. The SIM card may be configured with a SIM profile indicating an associated device type is base station type.

The authentication component 306 may call the communication component 308 to retrieve data from a subscriber database, data repository, and/or any other database to verify a subscriber account and/or associated device is authorized to use the services provided by the network device 300.

The communication component 308 can include functions to provide support for communication sessions with wireless devices. In some instances, the communication component 308 can correspond to the communication component 108 of FIG. 1. As described herein with respect to the communication component 108, the communication component 308 may support communication sessions between devices associated with different device types. In some examples, the communication component 308 may be installed on a network device that is implemented in a network node and may facilitate communication between the network node and the wireless devices within the coverage area of the network node. In various examples, the communication component 308 may receive a network access request from a device and call the authentication component 306 to authenticate the device. The communication component 308 may determine to adjust a communication parameter based in part on the device type and/or subscription information. The device type may include, but is not limited to, base station type, cell phone type, internet hub type, and the like.

In some examples, the communication component 308 may include functions to provide support for communication sessions with a wireless base station. The communication component 308 may receive SIM data and determine the device type for the wireless device. If the device type indicates a base station type, the communication component 308 may configure the wireless link for the wireless device to be a child node. The communication component 308 may send instructions to configure one or more network node settings to optimize the communication signal between nodes and devices (e.g., optimizing a wireless link from a donor node to the child node). The one or more network node settings may include, but is not limited to, adjusting an antenna direction and/or tilt (e.g., yaw, pitch, roll), selecting wireless backhaul band, changing transmission power level, changing the wireless throughput, and the like. The communication component 308 may send the configuration instructions to a local base station or to a connected base station. For instance, the communication component 308 may send a message including a command to change a tilt associated with an antenna of an associated base station.

The communication component 308 can collect data associated with a subscriber in a subscriber database. In some examples, the communication component 308 may include a common data repository of subscriber information and can be used to service network functions and/or used to determine the service available to a subscriber. The common data repository can be a shared database providing support for 2G/3G/4G/5G core and can store subscriber data, including subscriber information.

The communication component 308 may maintain a subscriber database with associated SIM data. The communication component 308 can collect data associated with subscribers, subscriber sessions, and/or registrations in the subscriber database. In various examples, the communication component 308 may utilize a common data repository, a shared database providing support for 2G/3G/4G/5G core, to store subscriber data, including subscriber information. The communication component 308 may collect and store information specific to the subscriber accounts and subscription, including one or more of: username, account identifier, subscription plan, services, data allocated, data used, prepaid charge, and the like. The communication component 308 can also collect information specific to a user device associated with a subscriber account, including a device type, a device identifier, communications capabilities, and the like. As described herein, the device type may include base station type, cell phone type, internet hub type, and the like. The device identifier may include Mobile Station International Subscriber Directory Number (MSISDN), International Mobile Subscriber Identity (IMSI), International Mobile Equipment Identity (IMEI) of the device, Universally Unique Identifier (UUID), and the like.

The scheduler component 310 may include functions to configure network nodes to provide coverage for a network. In some instances, the scheduler component 310 can correspond to the scheduler component 110 of FIG. 1. As described herein with respect to the scheduler component 110, the scheduler component 310 may determine to configure a base station to serve as a donor node and/or a child node. The scheduler component 310 may perform different functions based on whether the scheduler component 310 is on a local network device and/or a core network device. The scheduler component 310 may assign multiple nodes to a network cluster and designate one of the multiple nodes as a primary donor node for the network cluster. The primary donor node may typically be the only donor base station that is using a fiber link in the network cluster. If more than one wired base stations are assigned to a network cluster, the primary donor node may be selected from the more than one wired base stations based on a geographical location of the node including proximity to other nodes in the cluster. In some examples, the core network device may be a network device running from the primary donor node and/or from a cloud server. The scheduler component 310 running on the core network device and/or the primary donor node may implement the network scheduler for the network cluster. The scheduler component 310 may call the communication component 308 to send message and/or instructions to other nodes in the cluster to configure and/or reconfigure base station settings response to events (e.g., node failure, peak hour, etc.).

In some examples, the scheduler component 310 may be running from a core network device and may generate a network topology map to determine deployment and coverage for a particular coverage area. Initially, the scheduler component 310 may generate the network topology map to indicate coverage provided by the deployment of wired base stations in the particular coverage area. The scheduler component 310 may generate an enhanced network topology map that optimizes the placement of a network of wireless base stations to provide wireless coverage in coverage gaps. In various examples, the scheduler component 310 may further optimize base station placement based on providing backup wireless coverage in the event of a node failure. The scheduler component 310 may determine a network schedule with configuration settings for each base station within the particular coverage area, including default settings and one or more backup settings. The configuration settings for a base station may include powering down, rebooting, reinstalling software, changing a default parameter, running with default parameters, running with first backup parameter, reset to default parameters, and the like.

In various examples, the scheduler component 310 may be running from a local network device and may configure the local base station to function according to a network schedule. The scheduler component 310 may receive the network schedule from the core network and configure the local base station according to a present base station configuration setting. The scheduler component 310 may configure the local base station to serve as a donor and/or child node. For example, by default, the scheduler component 310 may configure the local base station to serve as a wired donor node for a first child node and may send instructions to the first child node to use a particular frequency band for wireless backhaul. In additional and/or alternative examples, the scheduler component 310 may configure a local base station to serve as a child node to a wired donor node and may call the communication component 308 to request network access from the wired donor node.

In some examples, the scheduler component 310 may configure the local base station to function as a backup node according to a network schedule. Once the scheduler component 310 establishes a connection from the local base station to a first child node, if the connection experiences an unexpected failure, the scheduler component 310 may attempt to re-establish the connection. After a predetermined number of failed attempts to re-establish the connection to the first child node, the scheduler component 310 may use the network schedule to determine whether the local base station needs to be configured to use one or more backup settings. If the network schedule indicates a backup setting based on the failure of the first child node, the scheduler component 310 may determine to establish a connection from the local base station to a second child node. The scheduler component 310 may transmit messages and/or commands for a recipient network node to adjust one or more base station settings to optimize the communication connection. For instance, the scheduler component 310 may send a message including a command to change a tilt associated with an antenna of an associated base station.

In various examples, the scheduler component 310 may include functions to configure the local base station to serve as a donor node for a child node. In some examples, the scheduler component 310 may select the frequency bands to use for wireless backhaul. In various examples, the local base station may be configured to use a wired connection as backhaul, and the scheduler component 310 may configure the local base station to use the frequency bands when serving as a donor. In an alternative example, the local base station may be a wireless base station that is also a child node using first frequency bands for backhaul, and the scheduler component 310 may determine to use second frequency bands as the donor. As described herein, the authentication component 306 may receive a network access request from a wireless base station to establish a wireless connection with the local base station. In response to a successful authentication for the wireless base station, the scheduler component 310 may configure the local base station to use a wireless spectrum to provide backhaul link for the wireless base station and to increase the bandwidth throughput to the wireless base station. The scheduler component 310 may also send instructions to the wireless base station to configure the base station to use the wireless spectrum for wireless backhaul. The local base station serves as a donor node for the wireless base station, and the wireless base station is now a child node of the local base station. In some examples, the local base station may also be a wireless base station that is also a child node to another base station, and the scheduler component 310 may select different frequency bands for each wireless backhaul. In some examples, the scheduler component 310 may determine which frequency bands to use for backhaul link and access link (e.g., 39 GHz as backhaul and 28 GHz on access, 28 GHz as backhaul and 28 GHz on access, 28 GHz as backhaul and 600 MHz on access, etc.). The scheduler component 310 may prioritize using high frequency bands (e.g., 28 GHz, 39 GHz, 24 GHz, etc.) for backhaul based on high frequency bands having higher bandwidth relative to low frequency bands.

In some examples, the scheduler component 310 may monitor traffic data associated with the network to continuously optimize the network. The traffic data may include data associated with network signal quality, capacity, connectivity, and the like. The data associated with network signal quality may include one or more of Channel Quality Information (CQI) data, signal-to-noise ratio (SNR) data, signal-to-interference plus noise ratio (SINR) data, and/or signal-to-noise plus distortion ratio (SNDR) data. As described herein, if a particular wireless base station is disconnected, the scheduler component 310 may send messages and commands for backup base stations to provide network gap coverage for the cell that is disconnected. The scheduler component 310 may determine a network signal quality falls below a signal quality threshold and transmit a message and/or command to affected base stations to change the wireless spectrum for the wireless backhaul link. If an amount of data and/or upstream data meets or exceeds a data threshold, the scheduler component 310 may determine to change the wireless spectrum to a different wireless spectrum capable of supporting the data threshold. If the network access capacity (amount of data) meets or exceeds a capacity threshold, the scheduler component 310 may generate and send a notification or message to a service provider associate to upgrade a wireless base station to a fiber backhaul.

The data transport component 312 may include functions to support data transmission between devices. In some examples, the data transport component 312 may receive upstream data ("uplink data") from all devices in a present access network and may aggregate the data for transmission to the donor node for wired transport. For instance, the data transport component 312, executing at a child node, may receive communication data from all the wireless devices served by the child node and may aggregate the communication data into a communication data packet, then forward the communication data packet to the donor node. In some examples, the data transport component 312, executing from a core network device, may parse the communication data packet to determine charge parameters for the wireless devices. The charge parameters may include, but is not limited to, device identifier, device type, subscription information, amount of data used, charge rate (e.g., monthly rate, data use rate, etc.), access time, access network type, and the like. The network device may determine a charge for the communication based on the charge parameters. In various examples, the data transport component 312 may receive downstream data ("downlink data") originating from the wired transport and may forward the downstream data to the designated network device(s).

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores. The processor(s) 302 is configured to retrieve and execute instructions from memory 304, respectively.

The memory 304 can also be described as non-transitory computer-readable media or machine-readable storage memory and may include removable and non-removable media implemented in any method or technology for storage of information, such as computer-executable instructions, data structures, program modules, or other data.

The memory 304 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The network device 300 also includes additional data storage devices (removable and/or non-removable) such as, for example, magnetic disks, optical disks, or tape. Such additional storage is illustrated in FIG. 3 by removable storage 314, and non-removable storage 316. Tangible computer-readable media can include volatile and non-volatile, removable and non-removable media implemented in any method or technology for storage of information, such as computer-readable instructions, data structures, program modules, or other data. The memory 304, the removable storage 314, and the non-removable storage 316 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the corresponding network device 300. Any such tangible computer-readable media can be part of the network device 300.

The memory 304, the removable storage 314, and/or the non-removable storage 316 may in some cases include storage media used to transfer or distribute instructions, applications, and/or data. In some cases, the memory 304, the removable storage 314, and/or the non-removable storage 316 may include data storage that is accessed remotely, such as network-attached storage that the corresponding network device 300 accesses over some type of data communications network.

In various examples, any or all of the memory 304, the removable storage 314, and/or the non-removable storage 316 may store programming instructions that, when executed, implement some or all of the function functionality described herein.

The network device 300 also can include input device(s) 318, such as a keypad, a cursor control, a touch-sensitive display, voice input device, etc., and output device(s) 320 such as a display, speakers, printers, etc. These devices are well known in the art and need not be discussed at length here.

As illustrated in FIG. 3, the network device 300 also include one or more wired or wireless transceiver(s) 322, respectively. For example, the transceiver(s) 322 can include a network interface card (NIC), a network adapter, a LAN adapter, or a physical, virtual, or logical address to connect to various networks, devices, or components illustrated in figures herein. To increase throughput when exchanging wireless data, the transceiver(s) 322 can utilize multiple-input/multiple-output (MIMO) technology. The transceiver(s) 322 can comprise any sort of wireless transceivers capable of engaging in wireless, radio frequency (RF) communication. The transceiver(s) 322 can also include other wireless modems, such as a modem for engaging in Wi-Fi, WiMAX, Bluetooth, infrared communication, and the like.

In some examples, the network device 300 can be implemented as the network device(s) 104 of FIG. 1, including the communication component 108 and/or the scheduler component 110.

Figure 4:
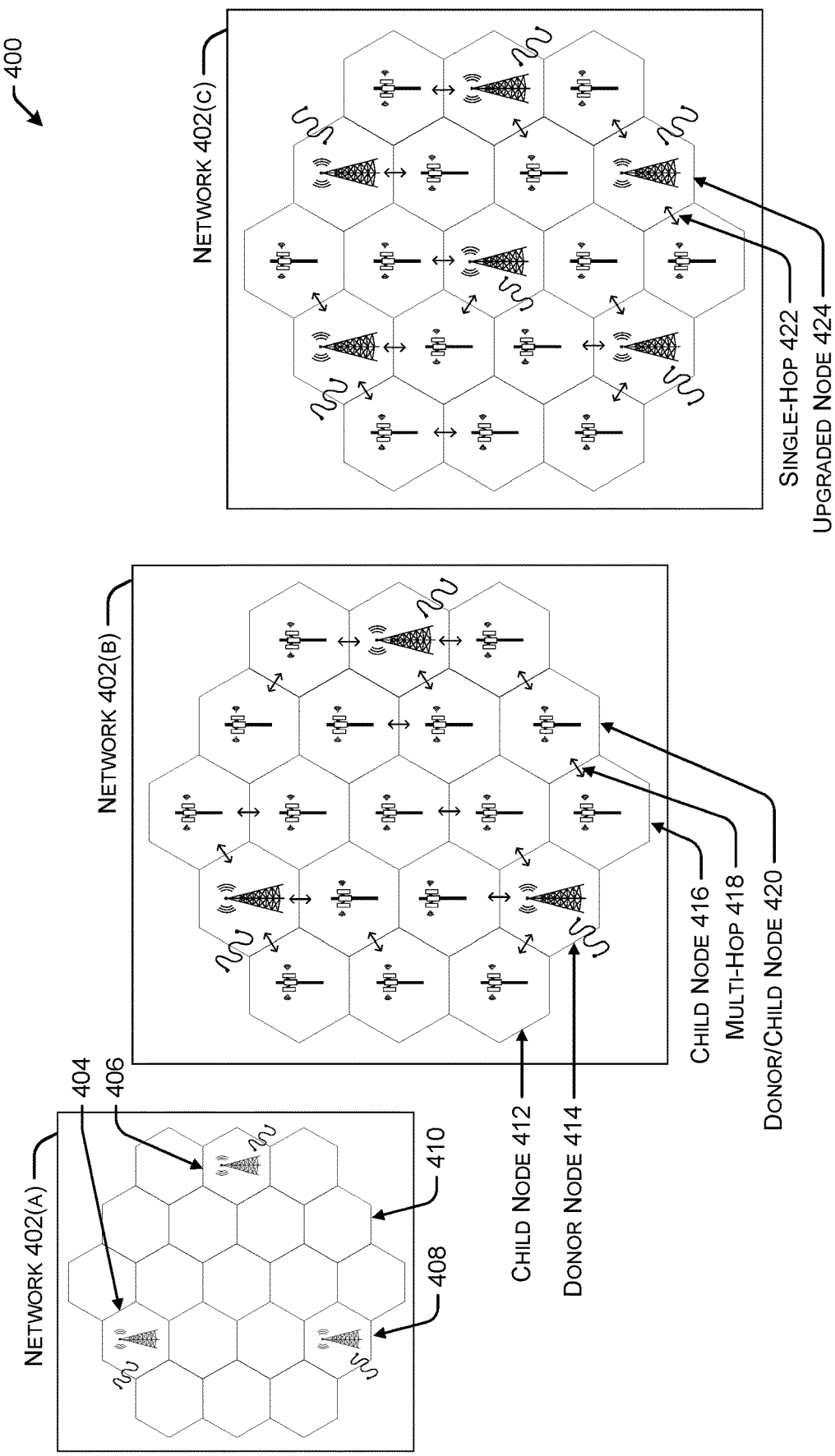
FIG. 4 is a schematic diagram showing example network deployment including network configurations while transitioning in coverage phases.

FIG. 4 is a schematic diagram showing example network deployment 400 including network configurations while transitioning in coverage phases. The coverage phases may include an example early network 402(a)(a), an example enhanced network 402(b), and an example upgraded network 402(c). The example early network 402(a) illustrates an example early phase of network coverage deployment. The example enhanced network 402(b) illustrates an example expansion on the initial network coverage deployment from the example early network 402(a). The example upgraded network 402(c) illustrates further development on the network coverage deployment from the example enhanced network 402(b).

The example early network 402(a) can include an example wired base stations 404, 406, and 408 and example coverage gap cell 410. The example early network 402(a) illustrates an example network during the early deployment phase with base stations 404, 406, and 408 using backhaul support by fiber cable. In the example early network 402(a), the network deployment can be in an example rural area and can include large coverage gaps due to limited coverage associated with time and cost for installing base stations with fiber cable. For instance, the large coverage gaps are indicated by the empty cells, including the example coverage gap cell 410.

The example enhanced network 402(b) can include an example child node 412, an example donor node 414, an example child node 416, an example multi-hop 418, and an example donor/child node 420. The example wired base stations 404, 406, and 408 deployed in the example early network 402(a) can now serve as donor nodes for wireless base stations. For instance, the example wired base station 408 is now serving as the example donor node 414 for the example child node 412 and the large coverage gaps may be filled with wireless base stations, including the example child node 412, the example child node 416, and the example donor/child node 420. In the present example, because each cell site does not require running a fiber cable, the network deployment may be faster. The example donor/child node 420 is both a donor node and a child node because it is receiving wireless backhaul link from a donor node, but also providing wireless backhaul link to the example child node 416. The example multi-hop 418 illustrates an example multi-hop connection where a wireless base station is serving as a donor for another wireless base station.

The example upgraded network 402(c) can include an example single-hop connection 422 and an example upgraded node 424. In this present example, the system may determine to optimize the example enhanced network 402(b) by upgrading some of the wireless base stations to wired base stations. The system may determine which base station to upgrade based on factors including but not limited to improvement to signal quality and/or additional access capacity needed. For instance, the example donor/child node 420 has been upgraded to the example upgraded node 424. By upgrading the example upgraded node 424, the previous example multi-hop connection 418 is now a single-hop connection as represented by the example single-hop connection 422. Connection signal degrades rapidly beyond a single-hop link; therefore, changing the triple-hop connection may improve network quality drastically for the child node 416.

FIGS. 5 and 6 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 5 illustrates an example process 500 for configuring a base station to support wireless backhaul. The example process 500 can be performed by the network device(s) 104 and/or by the network device 300 comprising the authentication component 306, the communication component 308, the scheduler component 310, the data transport component 312, or another component or device as discussed herein.

At operation 502, the process can include configuring a donor base station to use a wired connection as backhaul bandwidth and to serve as a donor node for a child node by providing wireless bandwidth to the child node. As described herein, the scheduler component 310 may include functions to configure the local base station to serve as the donor node for a child node. In some examples, the scheduler component 310 may select the frequency bands to use for wireless backhaul. In various examples, the local base station may be configured to use a wired connection as backhaul. The scheduler component 310 may configure the local base station to use the frequency bands when serving as a donor. In an alternative example, the local base station may be a wireless base station that is also a child node using first frequency bands for backhaul, and the scheduler component 310 may determine to use second frequency bands as the donor. As described herein, the authentication component 306 may receive a network access request from a wireless base station to establish a wireless connection with the local base station. In response to a successful authentication for the wireless base station, the scheduler component 310 may configure the local base station to use a frequency band spectrum to provide wireless link for the wireless base station and to increase the bandwidth throughput to the wireless base station. The scheduler component 310 may also send instructions to the wireless base station to configure the base station to use the frequency band spectrum for wireless backhaul.

At operation 504, the process can include configuring a child base station to use a wireless spectrum as backhaul bandwidth and use a Subscriber Identity Module (SIM) card, the SIM card configured with a SIM profile indicating an associated device type is base station type. As discussed above, the scheduler component 310 may also send instructions to the wireless base station to configure the base station to use the frequency band spectrum for wireless backhaul. As described herein, the network device 300 may be implemented in a wireless node and may be configured to use a SIM card associated with the cellular carrier to authenticate itself to access the cellular network provided by other network node(s). The SIM card may be configured with a SIM profile indicating an associated device type is base station type.

At operation 506, the process can include determining that the donor base station is wirelessly connected to a plurality of devices, wherein individual devices of the plurality of devices are associated with individual SIM. As described herein, the communication component 308 may be installed on a network device that is implemented in a network node and may facilitate communication between the network node and the wireless devices within the coverage area of the network node. In various examples, the communication component 308 may receive a network access request from a device and may call the authentication component 306 to authenticate the device with an associated SIM profile. The communication component 308 may determine to adjust a communication parameter based in part on the device type and/or subscription information. The device type may include, but is not limited to, base station type, cell phone type, internet hub type, and the like.

At operation 508, the process can include determining that the donor base station is wirelessly connected to the child base station. As described herein, the communication component 308 may determine that a connecting device is a child base station based on the SIM data and/or the SIM profile associated with the connecting device. If the communication component 308 determines the connecting device is associated with the base station type, the current network node may adjust the current network node settings to optimize the network connection to the connecting child base station.

At operation 510, the process can include determining, based at least in part on the SIM profile indicating the base station type, to increase bandwidth throughput from the donor base station to the child base station. As described herein, the communication component 308 may include functions to provide support for communication sessions with a wireless base station. The communication component 308 may receive SIM data and determine the device type for the wireless device. If the device type indicates a base station type, the communication component 308 may configure the wireless link for the wireless device to be a child node. The communication component 308 may send instructions to configure one or more network node settings to optimize the wireless link to the child node. The one or more network node settings may include, but is not limited to, adjusting antenna (e.g., yaw, pitch, roll), selecting wireless backhaul band, increasing transmission power, increasing the wireless throughput, and the like.

FIG. 6 illustrates another example process 600 for configuring a base station to support wireless backhaul. The example process 600 can be performed by the network device(s) 104 and/or by the network device 300 comprising the authentication component 306, the communication component 308, the scheduler component 310, the data transport component 312, or another component or device as discussed herein.

At operation 602, the process can include establishing, at a child base station, a wireless connection with a donor base station, wherein the donor base station serves as a donor node for the child base station by providing wireless bandwidth to the child base station. As described herein, the scheduler component 310 may include functions to configure the local base station to serve as a donor node for a child node. In some examples, the scheduler component 310 may select the frequency bands to use for wireless backhaul. In various examples, the local base station may be configured to use a wired connection as backhaul, and the scheduler component 310 may configure the local base station to use the frequency bands when serving as a donor. In an alternative example, the local base station may be a wireless base station that is also a child node using first frequency bands for backhaul, and the scheduler component 310 may determine to use second frequency bands as the donor. The scheduler component 310 may configure a local base station to serve as a child node to a wired donor node and may call the communication component 308 to request network access from the wired donor node.

At operation 604, the process can include receiving first data associated with a first connection between the child base station and a first device, wherein the first data includes a first SIM profile indicating a device type of the first device is a cell phone type. As described herein, the communication component 308 may be installed on a network device that is implemented in a network node and may facilitate communication between the network node and the wireless devices within the coverage area of the network node. In various examples, the communication component 308 may receive a network access request from a device and call the authentication component 306 to authenticate the device. The communication component 308 may determine to adjust a communication parameter based in part on the device type and/or subscription information. The device type may include, but is not limited to, base station type, cell phone type, internet hub type, and the like.

At operation 606, the process can include receiving second data associated with a second connection between the child base station and a second device, wherein the second data includes a second SIM profile indicating the device type of the second device is a base station type. As described herein, the communication component 308 may include functions to provide support for communication sessions with a wireless base station. The communication component 308 may receive SIM data and determine the device type for the wireless device. If the device type indicates a base station type, the communication component 308 may configure the wireless link for the wireless device to be a child node. The communication component 308 may send instructions to configure one or more network node settings to optimize the wireless link to the child node. The one or more network node settings may include, but is not limited to, adjusting antenna (e.g., yaw, pitch, roll), selecting wireless backhaul band, increasing transmission power, increasing the wireless throughput, and the like.

At operation 608, the process can include determining, based at least in part on the second SIM profile indicating the base station type, to increase bandwidth throughput for the second connection to the second device, wherein the child base station serves as the donor node for the second device. As described herein, the communication component 308 may receive SIM data and determine the device type for the wireless device. If the device type indicates a base station type, the communication component 308 may configure the wireless link for the wireless device to be a child node. The communication component 308 may send instructions to configure one or more network node settings to optimize the wireless link to the child node. The one or more network node settings may include, but is not limited to, adjusting antenna (e.g., yaw, pitch, roll), selecting wireless backhaul band, increasing transmission power, increasing the wireless throughput, and the like.

At operation 610, the process can include aggregating the first data and second data to form aggregated uplink data. As described herein, the data transport component 312 may include functions to support data transmission between devices. In some examples, the data transport component 312 may receive upstream data from all devices in a present access network and may aggregate the data for transmission to the donor node for wired transport.

At operation 612, the process can include transmitting the aggregated uplink data to the donor base station. As described herein, the data transport component 312 may receive upstream data from all devices in a present access network and may aggregate the data for transmission to the donor node for wired transport.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. A system comprising:
one or more processors;
a memory; and
one or more components stored in the memory and executable by the one or more processors to perform operations comprising:
configuring a donor base station to use a wired connection as backhaul bandwidth and to serve as a donor node for a child node by providing wireless bandwidth to the child node;
receiving, at the donor base station from a first device, a request to establish communication connection, wherein the first device is associated with a first Subscriber Identity Module (SIM) card;
determining that the first SIM card is associated with a first SIM profile that includes a device identifier for the first device and a device type for the first device, wherein the device type is a base station type indicating that the first device is a base station;
determining, based at least in part on the base station type, that the first device is a child base station;
determining that the donor base station is wirelessly connected to the child base station; and
determining, based at least in part on the base station type, to increase bandwidth throughput to the child base station.

2. The system of claim 1, wherein the child base station is a first child base station, and wherein the donor base station, the first child base station, and a second child base station correspond to a coverage area, and wherein the operations further comprise:
receiving uplink data from the first child base station;
determining, based at least in part on the uplink data, that the first child base station is wirelessly connected to a second child base station, wherein the first child base station is configured to be the donor node for the second child base station;
transmitting downlink data to the first child base station;
determining that the first child base station cannot be reached;
determining to adjust a first parameter of the donor base station to wirelessly connect to the second child base station; and
transmitting, to the second child base station, a message to adjust a second parameter of the second child base station to use the donor base station as the donor node.

3. The system of claim 2, wherein the second parameter includes a transmission power, and wherein the message comprises a command to increase the transmission power of an associated base station.

4. The system of claim 2, wherein the second parameter comprises an antenna direction, and wherein the message comprises a command to change a tilt associated with an antenna of an associated base station.

5. A method comprising:
receiving first data associated with a connection between a donor base station and a device, wherein the donor base station is configured to use a wired connection for backhaul bandwidth;
determining that the first data includes a Subscriber Identity Module (SIM) profile that includes a device identifier for the device and a device type for the device, wherein the device type is a base station type indicating that the device is a base station;
determining, based at least in part on the base station type, that the device is a child base station;
determining to configure the donor base station to serve as a donor node for the child base station by increasing wireless throughput to the child base station; and
sending an instruction to configure the child base station to use a first wireless spectrum as a wireless connection for backhaul bandwidth.

6. The method of claim 5, wherein the first data comprises signal data including at least one of:
Channel Quality Information (CQI) data;
signal-to-noise ratio (SNR) data;
signal-to-interference plus noise ratio (SINR) data; or
signal-to-noise plus distortion ratio (SNDR) data.

7. The method of claim 6, further comprising:
sending, based at least in part on the signal data, a second instruction to configure the donor base station to use a second wireless spectrum as wireless throughput for the child base station; and
sending, based at least in part on the signal data, a third instruction to configure the child base station to use a third wireless spectrum as the wireless connection and a fourth wireless spectrum as wireless access.

8. The method of claim 5, wherein the child base station is a first child base station, the method further comprising:
determining that the first child base station is wirelessly connected to a second child base station;
determining to transmit data from the donor base station to the second child base station;
determining that the first child base station cannot be reached;
determining to adjust a parameter of the donor base station to reach the second child base station; and
determining that the donor base station is wirelessly connected to the second child base station.

9. The method of claim 8, further comprising:
sending, to the second child base station, a message to set a second parameter of the second child base station, the message including a command to change a tilt associated with an antenna to the second child base station.

10. The method of claim 8, further comprising:
receiving an indication of reconnection to the first child base station; and
sending, to the second child base station, a second message to reset a second parameter of the second child base station.

11. The method of claim 5, further comprising:
receiving second data associated with the connection between the donor base station and the device;
determining that second data includes upstream data received from the child base station;
determining, based at least in part on a wireless spectrum, a data threshold;
determining that an amount of the upstream data meets or exceeds the data threshold; and
sending a second instruction to configure the child base station to use a second wireless spectrum as the wireless connection.

12. The method of claim 11, further comprising:
receiving third data associated with the connection between the donor base station and the device;
determining that a second amount of the upstream data meets or exceeds the data threshold; and
sending a notification to reconfigure the child base station from using a wireless connection to a wired connection.

13. The method of claim 5, further comprising:
receiving, from the child base station, a communication data packet including communication data from one or more other devices;
parsing the communication data packet to determine one or more other device identifiers associated with the one or more other devices; and
determining a charge for one of the one or more other devices, the one of the one or more other devices being associated with a cell phone type, wherein the charge is based at least in part on an amount of data used.

14. The method of claim 5, further comprising:
receiving, from the child base station, a communication data packet including communication data from one or more other devices;
parsing the communication data packet to determine one or more other device identifiers associated with the one or more other devices; and
determining a charge for one of the one or more other devices, the one of the one or more other devices being associated with a Internet hub type, wherein the charge is based at least in part on a monthly rate.

15. One or more non-transitory computer-readable media storing computer executable instructions that, when executed, cause one or more processors to perform operations comprising:
configuring a donor base station to use a wired connection as backhaul bandwidth and to serve as donor node for a child node by providing wireless bandwidth to the child node;
configuring the child node to use a wireless spectrum as backhaul bandwidth and use a Subscriber Identity Module (SIM) card, the SIM card configured with a SIM profile including a device identifier for the child node and a device type of the child node, wherein the device type is a base station type indicating that the child node is a base station;
determining, based at least in part on the base station type, that the child node is a child base station; and
determining, based at least in part on the base station type, to increase bandwidth throughput from the donor base station to the child base station.

16. The one or more non-transitory computer-readable media of claim 15, wherein the child base station is a first child base station, and the donor base station is a first base station, and wherein the operations further comprise:
determining that the first child base station is wirelessly connected to a second child base station, wherein the first child base station is configured to be the donor node for the second child base station;
determining to transmit data from the donor base station to the second child base station;
determining that the first child base station and the second child base station cannot be reached;

sending, to a second donor base station, a message to adjust a parameter of the second donor base station;

determining that the second donor base station is wirelessly connected to the second child base station; and sending, to the second child base station, a message to adjust a second parameter of the second child base station to use the second donor base station as the donor node.

17. The one or more non-transitory computer-readable media of claim 15, wherein the child base station is a first child base station, and wherein the operations further comprise:

determining that a second device is associated with a second SIM profile indicating the base station type;

determining, based at least in part on the second SIM profile indicating the base station type, that the donor base station is wirelessly connected to a second child base station; and determining, based at least in part on the second SIM profile indicating the base station type, to increase bandwidth throughput from the donor base station to the second child base station.

18. The one or more non-transitory computer-readable media of claim 17, wherein the operations further comprise:

receive first data from the first child base station;

receive second data from the second child base station; and determining to adjust the wireless spectrum for the first child base station and the second child base station based at least in part on the first data and the second data.

* * * * *